United States Patent
Shiau et al.

(10) Patent No.: US 10,614,003 B2
(45) Date of Patent: Apr. 7, 2020

(54) MEMORY CARD READING METHOD WHICH ADJUSTS READER TO HOST INTERFACE

(71) Applicant: Realtek Semiconductor Corp., HsinChu (TW)

(72) Inventors: Jiunn-Hung Shiau, Taipei (TW); Neng-Hsien Lin, Kaohsiung (TW)

(73) Assignee: Realtek Semiconductor Corp., HsinChu (TW)

( * ) Notice: Subject to any disclaimer, the term of this patent is extended or adjusted under 35 U.S.C. 154(b) by 226 days.

(21) Appl. No.: 15/786,606

(22) Filed: Oct. 18, 2017

(65) Prior Publication Data

US 2018/0129617 A1 May 10, 2018

(30) Foreign Application Priority Data

Nov. 9, 2016 (TW) .............................. 105136350 A

(51) Int. Cl.
*G06F 1/12* (2006.01)
*G06F 13/16* (2006.01)
*G06K 19/077* (2006.01)
*G11B 17/04* (2006.01)

(52) U.S. Cl.
CPC ... *G06F 13/1689* (2013.01); *G06K 19/07732* (2013.01); *G11B 17/0408* (2013.01); *G11B 2220/17* (2013.01); *Y02D 10/14* (2018.01)

(58) Field of Classification Search
None
See application file for complete search history.

(56) References Cited

U.S. PATENT DOCUMENTS

| | | | | |
|---|---|---|---|---|
| 2002/0126565 A1* | 9/2002 | Kawai | ................... | G11C 5/145 365/233.1 |
| 2004/0049627 A1* | 3/2004 | Piau | ..................... | G06F 3/0613 711/103 |
| 2005/0033917 A1* | 2/2005 | Takeuchi | .............. | G06F 13/385 711/115 |
| 2005/0066206 A1* | 3/2005 | Beers | .................... | G06F 1/3203 713/320 |
| 2009/0089543 A1* | 4/2009 | Gunther | ............. | G06F 9/30181 712/30 |
| 2010/0023678 A1* | 1/2010 | Nakanishi | ............... | G06F 1/206 711/103 |
| 2010/0268897 A1* | 10/2010 | Okamoto | ........... | G06F 13/1689 711/154 |
| 2011/0072168 A1* | 3/2011 | Zhao | ..................... | G06F 13/385 710/14 |
| 2014/0103125 A1* | 4/2014 | Wyatt | ..................... | G11C 5/00 236/1 F |

FOREIGN PATENT DOCUMENTS

TW 201112131 A1 4/2011

* cited by examiner

*Primary Examiner* — Nitin C Patel
(74) *Attorney, Agent, or Firm* — Winston Hsu

(57) ABSTRACT

A memory card reading method applied to an electronic device, includes: detecting a specification information of a memory card, wherein the specification information includes a transfer speed of the memory; and controlling according to the specification information a reader to host interface to operate in a first operating mode or a second operating mode for reading the memory card, wherein the first operating mode and the second operating mode correspond to different data transfer speeds.

14 Claims, 3 Drawing Sheets

MEMORY CARD READING METHOD WHICH ADJUSTS READER TO HOST INTERFACE

BACKGROUND OF THE INVENTION

1. Field of the Invention

The present invention relates to a memory card reading method, and more particularly, to a memory card reading method which adjusts a reader to the host interface.

2. Description of the Prior Art

As high quality images become more popular, data size has increased significantly, resulting in a required greater capacity and faster reading speed for memory cards. As the medium between the memory card and electronic products such as a computer, a memory card reader needs to employ high speed interface technology for communicating with the electronic product. If, however, the connecting interface between the memory card reader and the electronic products does not adjust accordingly when the reading speed between the front end memory card and the memory card reader increases, the potential speed increase provided by a memory card with a faster reading speed cannot be experienced by the user.

Users purchase memory cards with proper reading speeds based on their own needs. Because every user has different and changing needs, a memory card reader fulfilling everyone's needs should not only support different speeds, but its accompanying interface connect should also be able to support the fastest reading speed. A Peripheral Component Interconnect Express (PCIe) is currently a common connection interface between a memory card reader and an electronic product. Further, each generation with different frequency (e.g. GEN1 2.5 Gbps, GEN2 5 Gbps, GEN3 8 Gbps) of the PCIe can use a different number of channels for transmission. Conventionally, when a memory card is recognized, the highest bandwidth available and a maximum number of channels of the PCIe interface are used to read the connected memory card no matter the speed of the memory card. Therefore, when a slower memory card is connected, the PCIe interface still applies the highest bandwidth and the maximum number of channels for reading the slower memory card. This consumes a large amount of power and may cause a high operating temperature for the device.

SUMMARY OF THE INVENTION

The present invention proposes a memory card reading method by adjusting a reader-to-host interface to solve the aforementioned problem.

According to an embodiment of the present invention, a memory card reading method applied to an electronic device is disclosed, comprising: detecting a specification information of a memory card, wherein the specification information comprises a transfer speed of the memory card; and controlling according to the specification information a reader-to-host interface to operate in a first operating mode or a second operating mode for reading the memory card, wherein the first operating mode and the second operating mode correspond to different data transfer speeds.

According to an embodiment of the present invention, a memory card reading method applied to an electronic device is disclosed, comprising: controlling a read-to-host interface to operate in a first operating mode to read a memory card; determining if a status of the electronic device corresponds to a condition; and if the status corresponds to the condition, switching the reader-to-host interface from the first operating mode to a second operating mode, wherein the first operating mode and the second operating mode correspond to different data transfer speeds.

According to an embodiment of the present invention, a memory card reading system is disclosed, comprising: a reading circuit and a processing circuit. The reading circuit is arranged to detect a specification information of a memory card, wherein the specification information comprises a transfer speed of the memory card. The processing circuit is arranged to control a reader-to-host interface according to the specification information to operate in a first operating mode or a second operating mode for reading the memory card, wherein the first operating mode and the second operating mode correspond to different transfer speeds.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
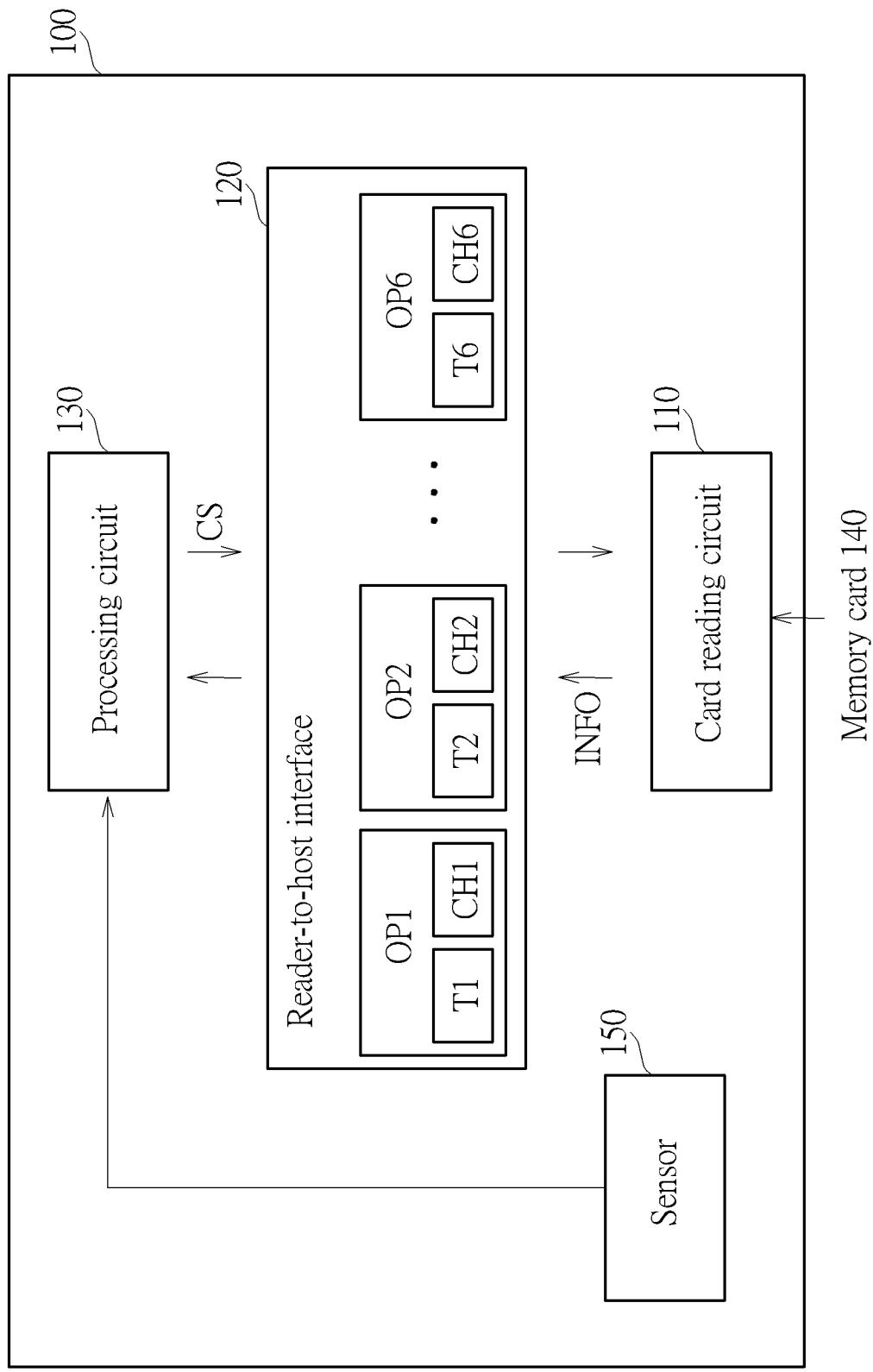
FIG. 1 is a diagram illustrating a memory card reading system according to an embodiment of the present invention.

FIG. 1 is a diagram illustrating a memory card reading system 100 according to an embodiment of the present invention. As shown in FIG. 1, the memory card reading system 100 comprises a card reading circuit 110, a reader-to-host interface 120 and a processing circuit 130. It should be noted that the memory card reading system 100 may be a memory card reading system installed within an electronic device (for example, a portable device such as a laptop, a tablet or a smart phone), and the reader-to-host interface 120 is an interface between a card reader (e.g. the card reading circuit 110 in this embodiment) and a processor of the electronic device (e.g. the processing circuit 130 in this embodiment). The reader-to-host interface 120 can be the PCIe mentioned above, but this is not a limitation of the present invention. For better comprehension, however, the PCIe is taken as an example of the reader-to-host interface 120 in the following embodiments. When the card reading circuit 110 senses the connection of a memory card 140, the card reading circuit 110 transfers an information INFO of the memory card 140 to the processing circuit 130 via the reader-to-host interface 120, wherein the information INFO comprises the specification of the memory card 140 such as the highest transfer speed, and the processing circuit 130 adjusts parameters in a Finite State Machine (FSM) of the reader-to-host interface 120 by a control signal CS according to the information INFO to select a different operating mode, e.g. operating modes OP1-OP6 shown in FIG. 1 for the reader-to-host interface 120, wherein each operating mode has a corresponding transfer speed, e.g. T1-T6 marked in FIG. 1, and a number of channels for transition, e.g. CH1-CH6 as marked in FIG. 1. It should be noted that the number of operating modes for the reader-to-host interface 120 is not a limitation of the present invention. Further, the transfer speed of each operating mode and the number of channels employed by the reader-to-host interface 120 for transition are not limited in the present invention. Taking the PCIe as an example, the processing circuit 130 can select different operating modes by entering recovery state of a Link Training and Status State Machine (LTSSM) in the PCIe. Table 1 lists 6 different operating modes and the corresponding transfer speed, the number of channels, and the maximum transfer speed.

TABLE 1

| PCIe Operating modes | Transfer speed | Number of channels | Maximum transfer speed |
|---|---|---|---|
| 1 | GEN1 2.5 Gbps | 1 | 250 MB |
| 2 | GEN1 2.5 Gbps | 2 | 500 MB |
| 3 | GEN2 5 Gbps | 1 | 500 MB |
| 4 | GEN2 5 Gbps | 2 | 1000 MB |
| 5 | GEN3 8 Gbps | 1 | 1000 MB |
| 6 | GEN3 8 Gbps | 2 | 2000 MB |

It can be observed from Table 1 that the transfer speed, the number of channels, and the maximum transfer speed for the PCIe under different operating modes are not exactly the same. After the information INFO comprising information such as the maximum transfer speed is received, the processing circuit 130 shown in FIG. 1 selects a proper operating mode for the reader-to-host interface 120 accordingly to save unnecessary power consumption. For example, assuming that the memory card 140 is a secure digital Ultra High Speed-I memory card, the maximum transfer speed is 104 MB/S. Instead of selecting the sixth operating mode whose maximum transfer speed is 2000 MB as mentioned in the prior art, the processing circuit 130 selects the first operating mode shown in Table 1 whose maximum transfer speed is 250 MB to read the memory card. In another example, assuming that the memory card 140 is a secure digital Ultra High Speed-II HD memory card, the maximum transfer speed is 312 MB/S. Instead of selecting the sixth operating mode whose maximum transfer speed is 2000 MB as mentioned in the prior art, the processing circuit 130 selects the second or third operating mode whose maximum transfer speed is 500 MB to read the memory card.

As mentioned in the prior art, great power consumption might cause an overheating issue of an electronic device. Therefore, the memory card reading system 100 may comprise a temperature sensor 150. Once the temperature is over a predetermined value, e.g. 50 degrees Celsius, the processing circuit 130 is notified by the sensor 150 to change the operating mode of the reader-to-host interface 120 dynamically. For example, the operating mode employing fewer channels or lower transfer speed for transition is used to lower the temperature. It should be noted that the method for sensing the temperature is not a limitation of the present invention. In other embodiments, the system 100 can notify the processing circuit 130 using software, hardware or firmware to change the operating mode of the reader-to-host interface 120 to lower the temperature. These alternative designs also fall within the scope of the present invention. If the temperature is lowered, the card reading circuit 110 dynamically determines if the transfer speed for reading the memory card 140 is lower than the maximum transfer speed of the memory card 140. If yes, the processing circuit 130 is notified to change the operating mode for the reader-to-host interface 120. For example, the operating mode employing more channels or higher transfer speed for transition is used to read the memory card 140 effectively.

Figure 2:
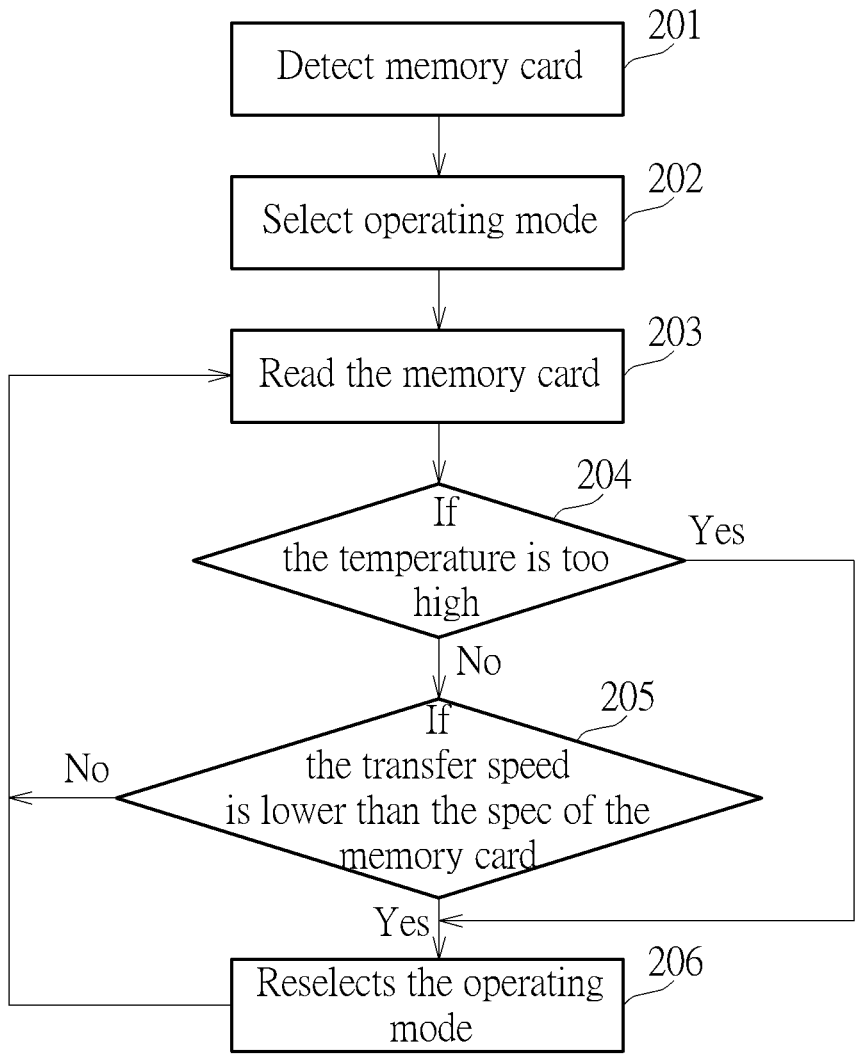
FIG. 2 is a flowchart illustrating a memory card reading method according to an embodiment of the present invention.

FIG. 2 is a flowchart illustrating a memory card reading method according to an embodiment of the present invention. Provided that the result is substantially the same, the steps are not required to be executed in the exact order shown in FIG. 2. The memory card reading method is summarized as follows.

Step 201: the card reading circuit 110 detects the specification of the memory card 140, and transfers the information INFO to the processing circuit 130.

Step 202: the processing circuit 130 selects a proper operating mode for the reader-to-host interface 120 according to the information INFO.

Step 203: the card reading circuit 110 reads, writes or stay idle with the memory card 140.

Step 204: the sensor 150 determines if the temperature of the system is higher than a predetermined value. If yes, the flow goes to step 206; otherwise, the flow goes to step 205.

Step 205: the card reading circuit 110 determines if the current operating mode is lower than the specification of the memory card 140. If yes, the flow goes to step 206; otherwise, the flow goes to step 203.

Step 206: the processing circuit 130 reselects the operating mode for the reader-to-host interface.

Those skilled in the art should readily understand the detail of each step shown in FIG. 2 after reading the abovementioned paragraphs. A detailed description is therefore omitted here for brevity. It should be noted that the flowchart shown in FIG. 2 is an embodiment of the memory card reading system considering system temperature as the first priority. In another embodiment, the memory card reading system may consider the transfer speed of the memory card as the first priority.

Figure 3:
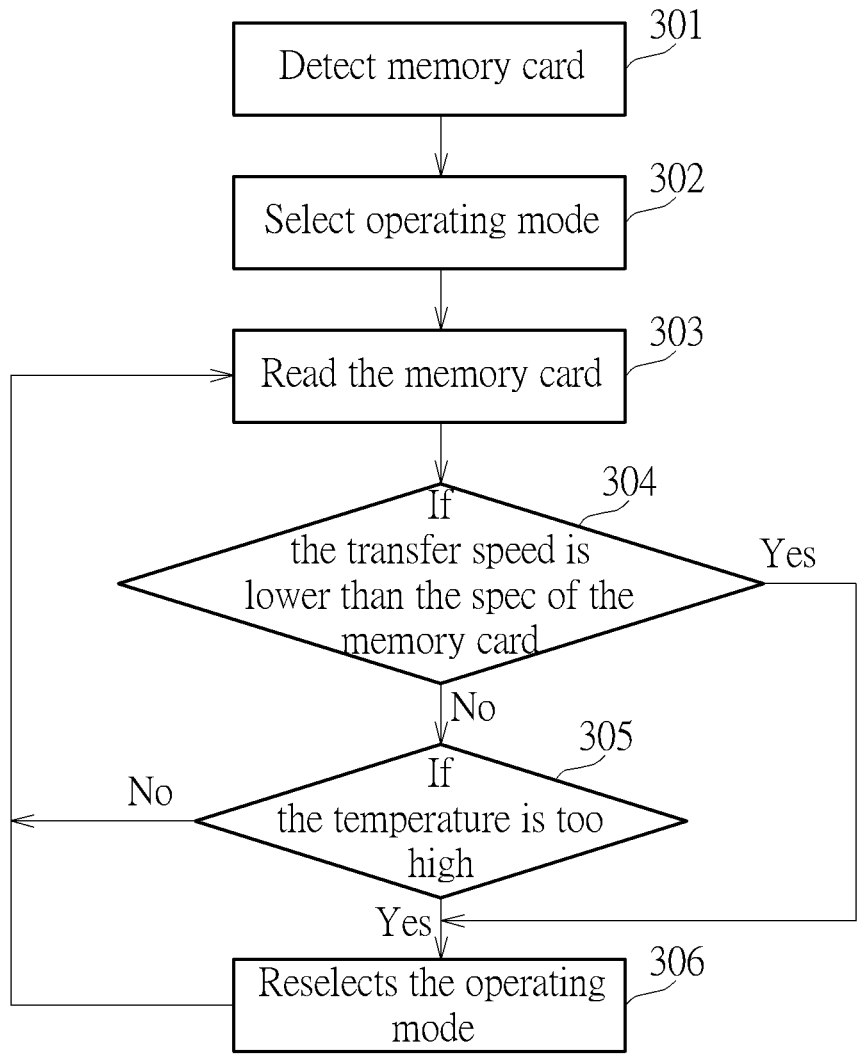
FIG. 3 is a flowchart illustrating a memory card reading method according to another embodiment of the present invention.

FIG. 3 is a flowchart illustrating a memory card reading method according to another embodiment of the present invention. Provided that the result is substantially the same, the steps are not required to be executed in the exact order shown in FIG. 3. The memory card reading method is summarized as follows.

Step 301: the card reading circuit 110 detects the specification of the memory card 140, and transfers the information INFO to the processing circuit 130.

Step 302: the processing circuit 130 selects a proper operating mode for the reader-to-host interface 120 according to the information INFO.

Step 303: the card reading circuit 110 reads, writes or stay idle with the memory card 140.

Step 304: the card reading circuit 110 determines if the current operating mode is lower than the specification of the memory card 140. If yes, the flow goes to step 306; otherwise, the flow goes to step 305.

Step 305: the sensor 150 determines if the temperature of the system is higher than a predetermined value. If yes, the flow goes to step 306; otherwise, the flow goes to step 303.

Step 306: the processing circuit 130 reselects the operating mode for the reader-to-host interface 120.

Those skilled in the art should readily understand the detail of each step shown in FIG. 3 after reading the abovementioned paragraphs. The detailed description is therefore omitted here for brevity.

Briefly summarized, the present invention discloses a memory card reading method. By reading the specification of the memory card and adjusting the parameter of the FSM in the reader-to-host interface according to the specification to select a proper operating mode, the power consumption can be saved effectively. Further, by monitoring if the system temperature is higher than a predetermined value and dynamically changing the operating mode, the risk to a user's safety can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory card reading method applied to an electronic device, comprising:
    detecting a specification information of a memory card, wherein the specification information comprises a transfer speed of the memory card;
    controlling according to the specification information a reader-to-host interface to operate under a first operating mode or a second operating mode which is selected as a current operating mode for reading the memory card, wherein the first operating mode and the second operating mode correspond to different data transfer speeds,
    determining if a status of the reader-to-host interface or the electronic device corresponds to a first condition; and
    when the status corresponds to the first condition, changing the current operating mode for the reader-to-host interface to another operating mode with a different data transfer speed than the current operating mode.

2. The memory card reading method of claim 1, wherein the first operating mode employs a first number of channels for transition, and the second operating mode employs a second number of channels different from the first number of channels.

3. The memory card reading method of claim 1, wherein the first operating mode corresponds to a first transfer speed and the second operating mode corresponds to a second transfer speed different from the first transfer speed.

4. The memory card reading method of claim 1, wherein the first condition is whether the electronic device temperature is higher than a predetermined temperature or whether the current operating mode for the reader-to-host interface corresponds to a transfer speed lower than the transfer speed of the memory card.

5. The memory card reading method of claim 1, further comprising:
    when the status does not correspond to the first condition, determining if an operation of the reader-to-host interface corresponds to a second condition;
    when the operation of the reader-to-host interface corresponds to a second condition, changing the current operating mode for the reader-to-host interface to another operating mode with a different data transfer speed than the current operating mode; and
    when the operation of the reader-to-host interface does not correspond to the second condition, maintaining the current operating mode.

6. The memory card reading method of claim 5, wherein the first condition is whether the electronic device temperature is higher than a predetermined temperature, and the second condition is whether the current operating for the reader-to-host interface corresponds to a transfer speed lower than the transfer speed of the memory card.

7. A memory card reading method applied to an electronic device, comprising:
    controlling according to a specification information of a memory card a reader-to-host interface to operate under a first operating mode which is selected as a current operating mode for reading the to read a memory card;
    determining if a status of the electronic device corresponds to a condition;
    when the status corresponds to the condition, changing the current operating mode for the reader-to-host interface to a second operating mode with a different data transfer speed than the current operating mode.

8. The memory card reading method of claim 7, wherein the condition is whether the electronic device temperature is higher than a predetermined temperature.

9. A memory card reading system, comprising:
    a card reading circuit, arranged to detect a specification information of a memory card, wherein the specification information comprises a transfer speed of the memory card; and
    a processing circuit, arranged to control according to the specification information a reader-to-host interface to operate under a first operating mode or a second operating mode which is selected as a current operating mode for reading the memory card, wherein the first operating mode and the second operating mode have different data transfer speeds,
    wherein when a status of the reader-to-host interface corresponds to a first condition, the processing circuit is further arranged to change the current operating mode for the reader-to-host interface to another operating mode with a different data transfer speed than the current operating mode.

10. The memory card reading system of claim 9, wherein the first operating mode employs a first number of channels for transition, and the second operating mode employs a second number of channels different from the first number of channels.

11. The memory card reading system of claim 9, wherein the first operating mode corresponds to a first transfer speed and the second operating mode corresponds to a second transfer speed different from the first transfer speed.

12. The memory card reading system of claim 9, wherein when a status of the reader-to-host interface corresponds to a first condition, the processing circuit is further arranged to change the current operating mode for the reader-to-host interface to another operating mode with a different data transfer speed than the current operating mode.

13. The memory card reading system of claim 9, wherein when the status does not correspond to the first condition, the processing circuit determines if an operation of the reader-to-host interface corresponds to a second condition; when the operation of the reader-to-host interface corresponds to a second condition, the processing circuit changes the current operating mode for the reader-to-host interface to another operating mode with a different data transfer speed than the current operating mode; and when the operation of the reader-to-host interface does not correspond to the second condition, the processing circuit maintains the current operating mode for the reader-to-host interface.

14. The memory card reading system of claim 13, wherein the first condition is whether the electronic device temperature is higher than a predetermined temperature, and the second condition is whether the current operating for the reader-to-host interface corresponds to a transfer speed lower than the transfer speed of the memory card.

\* \* \* \* \*